US011442936B2

(12) United States Patent
Aaron et al.

(10) Patent No.: US 11,442,936 B2
(45) Date of Patent: Sep. 13, 2022

(54) AUTOMATIC CONTROL LOOP SEARCHING

(71) Applicant: AT&T Intellectual Property I, L.P., Atlanta, GA (US)

(72) Inventors: Jeffrey Aaron, Atlanta, GA (US); James Fan, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 57 days.

(21) Appl. No.: 16/814,232

(22) Filed: Mar. 10, 2020

(65) Prior Publication Data

US 2021/0286818 A1   Sep. 16, 2021

(51) Int. Cl.
G06F 16/24 (2019.01)
G06F 16/2453 (2019.01)

(52) U.S. Cl.
CPC .............................. *G06F 16/24542* (2019.01)

(58) Field of Classification Search
None
See application file for complete search history.

(56) References Cited

U.S. PATENT DOCUMENTS

| 2012/0124088 A1* | 5/2012 | Meshkati | H04W 48/16 |
| | | | 707/771 |
| 2013/0262509 A1* | 10/2013 | Athsani | H04L 67/18 |
| | | | 707/769 |
| 2017/0371979 A1* | 12/2017 | Murphey | G06F 16/906 |
| 2019/0279627 A1* | 9/2019 | Wang | G06F 16/632 |

* cited by examiner

*Primary Examiner* — Augustine K. Obisesan
(74) *Attorney, Agent, or Firm* — Hartman & Citrin LLC (57) ABSTRACT

Concepts and technologies disclosed herein are directed to automated control loop searching ("ACLS"). According to one aspect disclosed herein, an ACLS system can create a search model that provides high-level information regarding what the ACLS system should search for when a search pattern is detected within data that is output from execution of a control loop. The ACLS system can activate a control loop system that executes the control loop to yield the data as output. The ACLS system can detect the search pattern within data, and in response, the ACLS system can execute, based upon the search model, a search of the data. The ACLS system can collect search results of the search and select additional data from the search results.

20 Claims, 6 Drawing Sheets

AUTOMATIC CONTROL LOOP SEARCHING

BACKGROUND

A control loop, also known as an automation loop or automation instance, is designed and deployed to mechanize manual processes to execute actions with no or minimal human intervention. The impact caused by the execution of a control loop can be detected through the analysis of data and environmental changes by a separate collection and analysis application. This analysis is currently performed with considerable additional effort and planning, and is likely to be insufficient in collecting and labeling data needed for machine learning. This is desired to reduce the need for manual software development, both initially and in terms of on-going improvements, optimizations, and extensions.

Traditional automation approaches do not learn and cannot evaluate themselves to help their human users/owners improve their operation. Currently, humans must manually setup means to conduct performance measurements on an adhoc basis, which is expensive, difficult, and largely ineffective due to limited scope and duration. Moreover, current approaches often lack flexibility or are unable to be exercised flexibly due to the added expense of repeated "customization."

SUMMARY

Concepts and technologies disclosed herein are directed to aspects of automatic control loop searching ("ACLS") system. According to one aspect of the concepts and technologies disclosed herein, an ACLS system can create a search model that provides high-level information regarding what the ACLS system should search for when a search pattern is detected within data that is output from execution of a control loop. The ACLS system can activate a control loop system that executes the control loop to yield the data as output. The ACLS system can detect the search pattern within data, and in response, the ACLS system can execute, based upon the search model, a search of the data. The ACLS system can collect search results of the search and select additional data from the search results.

In some embodiments, the ACLS system can establish a policy. The policy can be a searching policy that specifies a search distance. The search distance can define how deep the collecting operation should be for the search model and how often/long the collecting operation should be run. The ACLS can evaluate the search (e.g., as an ongoing operation) to ensure the search distance is not exceeded.

In some embodiments, the ACLS system can store the search model (and any associated search patterns) in a database. The ACLS system can retrieve the search model from the database. The ACLS system can interpret the search model to determine the additional data to search for within the data output by the control loop.

In some embodiments, the ACLS system can determine whether a correlation exists among the search results. The correlation can be defined, at least in part, by correlation criteria. The correlation criteria can be defined in a policy. The ACLS system can select the additional data from the search results based upon the correlation criteria.

In some embodiments, the ACLS system can format the additional data. The ACLS system can label the additional data for use by an output system. The ACLS system can provide the additional data to the output system. The output system can be a machine learning system or a system operated by a user, for example.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Currently, automation is primarily deterministic, meaning that humans must fully understand the scope and details of what is relevant when automating tasks. There is no way for automation itself to discover additional data that may be relevant to achieving increased performance and efficiency. Data mining of available data can be performed, but this mined data is not chosen, selected, or otherwise determined by the automation processes themselves. Accordingly, this mined data may or may not include data that is relevant to learning new, useful patterns. The concepts and technologies disclosed herein provide an automation for automatically searching for additional data that may be useful in various ways. After the automation is setup, the automation can operate without supervision to discover new data and patterns for future use.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
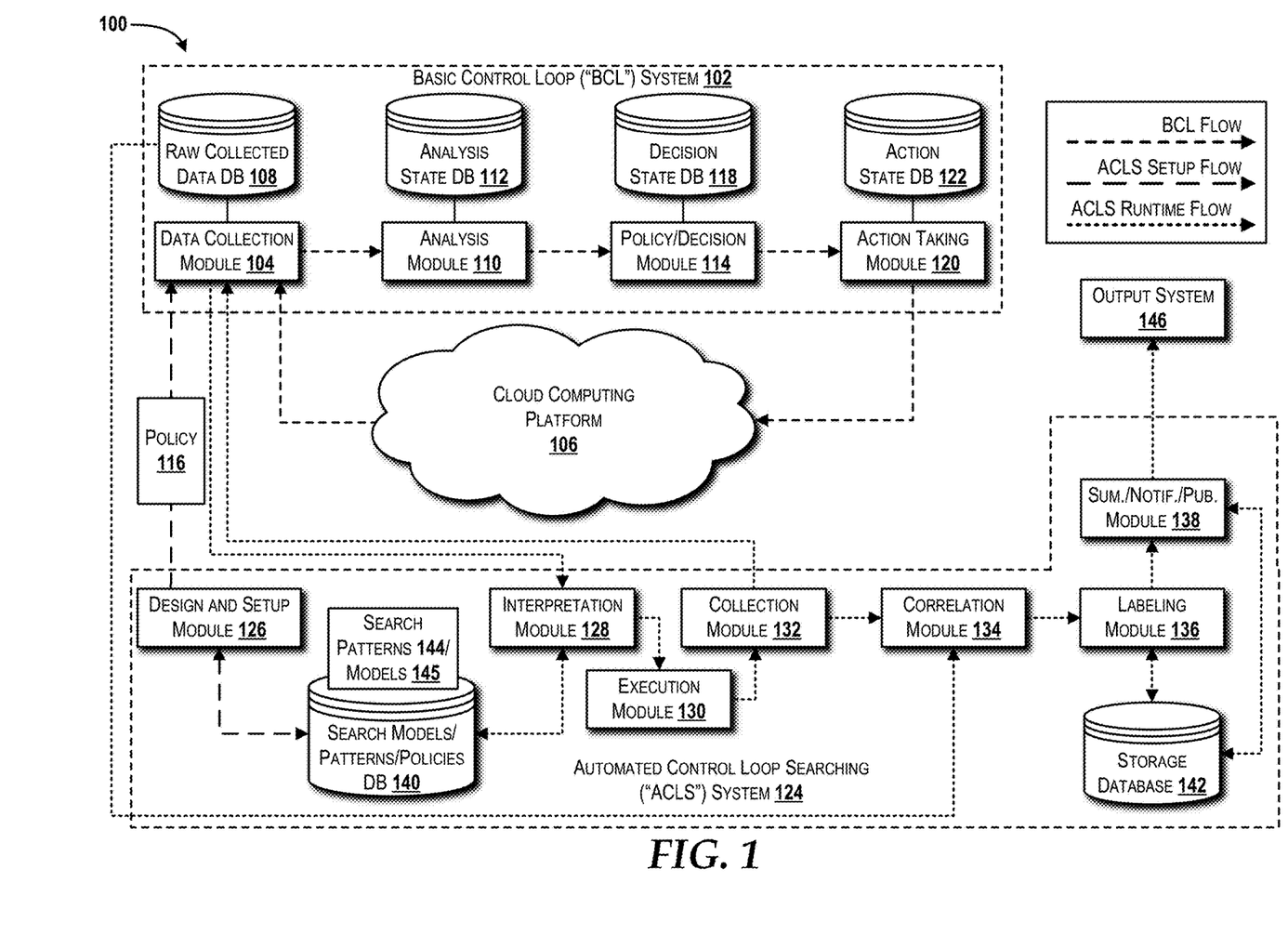
FIG. 1 is a block diagram illustrating aspects of an illustrative operating environment for various concepts and technologies disclosed herein.

Turning now to FIG. 1, an operating environment 100 in which embodiments of the concepts and technologies disclosed herein will be described. The illustrated operating environment 100 includes a basic control loop ("BCL") system 102. The BCL system 102 can implement one or more control loops, also known as an automation loop or automation instance, to mechanize one or more processes to execute one or more actions with no or minimal human interaction. For example, a basic control loop may be designed to collect relevant data, perform analysis on that data, apply any applicable policy(ies), and then perform one or more mitigation actions. The control loop(s) implemented by the BCL system 102 can be used to mechanize any manual process, and as such, the examples disclosed herein are merely exemplary and should not be construed as being limiting in any way.

The BCL system 102 can be implemented, at least in part, via a plurality of modules. The plurality of modules can be or can include hardware modules, software modules, or a combination of hardware and software modules. The modules may be implemented, at least in part, by virtualized components. The BCL system 102 can include one or more processors, one or more memory components, one or more network components, one or more input/output components, other components, combinations thereof, and/or the like. The BCL system 102 may be implemented as a system-on-a-chip or similarly packaged system. The BCL system 102 is shown with a select few modules and corresponding databases to implement one or more basic control loops. While these modules are shown as part of a single system, these modules alternatively may be distributed across multiple systems. Moreover, the BCL system 102 may include additional modules that provide additional features for implementing control loops.

The illustrated BCL system 102 includes a data collection module 104 that can collect data from one or more data sources. In the illustrated example, the data collection module 104 can collect data from a cloud computing platform 106 or any component thereof. Data collected by the data collection module 104 can be stored, at least temporarily, in a raw collected data database 108. The data stored in the raw collected data database 108 can be analyzed (e.g., filtered and correlated) by an analysis module 110 that maintains the state of data analyses in an analysis state database 112. A policy/decision module 114 can apply one or more policies 116 to the analyzed data and maintain, in a decision state database 118, the decisions made by the BCL system 102 as a result of applying one or more of the policies 116 to the analyzed data. Based upon these decisions, an action taking module 120 can take one or more actions that can be recorded in an action state database 122. Output of the action taking module 120 can be sent back to the cloud computing platform 106, which can implement the action(s) recommended by the action taking module 120.

In prior implementations of control loop systems, such as the basic control loop system 102, policies about what data to collect is fixed and data collection is repeated multiple times. A drawback to this is that the actions performed do not solve the problem(s) and, in some instances, may exacerbate the problem(s). When this happens, operators do not have the correct amount of data collected to perform analysis to determine why the actions did not fix the problem.

The concepts and technologies disclosed herein introduce an automated control loop searching ("ACLS") system 124. The ACLS system 124 can be used to opportunistically search for unused data, correlate the unused data with already-used data, and label the unused data accordingly. Search patterns and models can be used to find data that are already considered important, not already collected, or possibly not even suspected of being relevant. Search patterns and models can automatically trigger collection and labeling this data over time. The unused data can be a selectable degree of search distance away from the already-used data. This search distance can be defined in various ways as needed for a given implementation of the concepts and technologies disclosed herein. For example, a search distance may be temporal, such as within a specified number of hours of an action being taken. As another example, a search distance may be a network-based search distance, such as a number hops from the data source that was targeted by the automation (e.g., a specific node operating as part of the cloud computing platform 106). Alternatively, a search distance may be defined as being within the same rack or adjacent rack(s) of a data center, within the same or an adjacent subnet, or the like. The definition of a search distance may be absolute, relative, or conditional. Various technical aspects may be used to, at least partially, define a search distance, including, for example, one or more of the policies 116.

The illustrated ACLS system 124 includes a plurality of modules that can be implemented in hardware, software, or a combination of hardware and software. The modules may be implemented, at least in part, by virtualized components. The ACLS system 124 can include one or more processors, one or more memory components, one or more network components, one or more input/output components, other components, combination thereof, and/or the like. The ACLS system 124 may be implemented as a system-on-a-chip or similarly packaged system. The ACLS system 124 is shown with a select few modules to enable the concepts and technologies disclosed herein. While these modules are shown as part of a single system, these modules may alternatively be distributed across multiple systems.

The illustrated ACLS system 124 includes a search model/pattern/policy design and setup module (illustrated as "design and setup module") 126, an interpretation module 128, an execution module 130, a collection module 132, a correlation module 134, a labeling module 136, and a summary/notification/publication module 138. The illustrated ACLS system 124 also includes a search models, patterns, and policies database (illustrated as "search models/patterns/policies DB") 140 and a storage database 142. Each of these modules and databases will now be described. Additional details about the various modules implemented by the ACLS system 124 will be described in greater detail below with reference to the method 200 shown in FIG. 2.

The design and setup module 126 can be executed by the ACLS system 124 to enable one or more human operators (not shown) to design and create one or more search patterns 144 and/or one or more search models 145 and the policy(ies) 116. In some embodiments, the search patterns 144 can be defined by human operators and data analysis. The search patterns can be enhanced over time by human operators and/or by a machine learning model output. In other words, the search patterns 144 can evolve over time either manually or semi-automatically (i.e., machine learning can suggest a change, a human operator can validate the change, and then the change can be made).

The design and setup module 126 provides an interface that allows human operators and/or external systems (not shown) to set up the policy(ies) 116 ahead of time. The design and setup module 126 also provides the appropriate policy(ies) 116 to other modules, such as the interpretation module 128, the execution module 130, the collection module 132, the correlation module 134, the labeling module 136, and the summary/notification publication module 138 operating as part of the ACLS system 124. In addition, the design and setup module 126 can provide the appropriate policy(ies) 116 to the data collection module 104 operating as part of the BCL system 102. The data collection module 104 can interact with the interpretation module 128, which uses data collected by the data collection module 104 to determine a search pattern 144 that matches the data.

As used herein, a "search model" 145 can provide high-level information regarding what the ACLS system 124 should search for when a particular "search pattern" 144 is detected. For example, the BCL system 102 can execute a control loop that was triggered by a fault event that leads to an analysis to determine one or more actions to be taken to mitigate the fault, such as an action to reboot a set of servers operating in one virtual cluster. Prior systems do not perform any further analysis. The concepts and technologies disclosed herein, however, can continue analysis by first defining a set of search patterns 144 with each search pattern 144 mapped to at least one prebuilt search model 145. A first example search pattern 144 may be, after a successful reboot, to measure a CPU usage every X minutes to see if normal behavior has resumed. A second example search pattern 144 may be, after a successful reboot, to measure a storage usage every X minutes to see if any threshold value exceeds a predefined normal range. A third example search pattern 144 may be, after a successful reboot, to measure the average response to see if any threshold value exceeds a predefined value.

Because pattern detection occurs immediately after performance of an action, pattern detection does not follow normal monitoring processes. Assuming a certain pattern (e.g., response time) does not behave well, this pattern can be used to search the models/patterns/policies DB 140 to determine which search model 145 to execute to collect valuable data that can be used for analysis. If additional data is not collected at this stage, the data may never be gathered through normal processes. The search model 145 can be executed to provide guidance with regard to what additional data to collect, how data are aggregated, and the distance. For example, the search model 145 can be executed to determine if data also should be collected from nearby a system/device/cluster/etc., or whether data also should be collected from a system/device/cluster/etc. located a certain physical distance (e.g., 150 miles) away from a data center.

Any dataset that has been collected, filtered, cleaned, and correlated, can be labelled accurately and automatically by the labeling module 136. Labelling policies, as part of the policies 116, can provide labeling guidance given a set of input data attributes and to which category the data set belongs. For example, if the input is CPU usage for Server 1, CPU usage for Server 2, and so on, the output label may be "normal" or "abnormal." The labelled data set can be consumed by any artificial intelligence and/or machine learning modules, such as provided by an output system 146, to derive insights. This removes the need for manual labeling. Since the BCL system 102 may execute millions of control loops in any given timeframe, the amount of data produced by the BLC system 102 makes it impractical for manual labeling.

The policy(ies) 116 created by the design and setup module 126 can provide information with regard to how to identify a search pattern 144, how to map a search pattern 144 to a search model 145, how to perform data collection when certain criteria are not fully met, how to aggregate and correlate data sets, and how to perform an accurate labeling process, among other considerations. The policy(ies) 116 can be utilized by the various modules of the ACLS system 124. The policies 116 may be specified for individual modules or multiple modules. Although the search models/patterns/policies database 140 is shown as being in communication with only the design and setup module 126 and the interpretation module 128, the other modules, including the execution module 130, the collection module 132, the correlation module 134, the labeling module 136, and the summary/notification/publication module 138, can be in communication with the search models/patterns/policies database 140 to retrieve the policy(ies) 116. It is contemplated that one or more of these modules may share the policy(ies) 116 with other modules. For example, the collection module 132 may pass the policy 116 to the correlation module 134, wherein the policy 116 includes components applicable to both the collection module 132 (i.e., collection policy) and the correlation module 134 (i.e., correlation policy). The policy(ies) 116 can include one or more search policies. The search policy(ies) 116 can define a search distance. The policy(ies) 116 can include one or more collection policies. The collection policy(ies) can define when to collect data, what data to collect, how often to collect data, and from where to collect data (e.g., follow a specific search model), and when to stop collection. The policy(ies) 116 can include one or more correlation policies. The correlation policy(ies) can define one or more rules to correlate gathered data attributes or data set(s) to another data set (e.g., existing or new). A purpose of the correlation policies is to enhance the depth of the dataset via relationships. The policy(ies) 116 can include one or more correlation-degree policies. The correlation policy(ies) 116 can define how deep the correlation action needs to be performed. One degree implies the closest distance of the data set. Two degrees implies broader correlation is needed. For example, if one degree implies the data set needs to be joined with an upstream controller data set, then two degrees implies the data set also needs to be correlated with a device data set. The policy(ies) 116 can include one or more labeling policies. The ACLS system 124 can label the data for use by the output system 146 based, at least in part, upon the labeling policy. The labeling policy(ies) can define how to label newly created data sets and/or raw data sets. The labeling policy(ies) can be used to label data for use by the output system 146. In some embodiments, the output system 146 can be or can include a machine learning system. In some embodiments, the output system 146 can be or can include a system operated by a human operator. The policy (ies) 116 can include one or more publishing policies. The ACLS system 124 can publish the data labeled in accordance with the labeling policy based, at least in part, upon the publishing policy. The publishing policy can be used to determine how all gathered data is to be published for use by the output system. The policy(ies) can include one or more notification policies. The ACLS system 124 can notify the output system 146 based, at least in part, upon the notification policy. The notification policy(ies) can define what to notify, who to notify, what to do if notification fails, and what to do if no response is received after a certain period of time. The notification policy(ies) can be used to proactively notify a human operator (e.g., operator of the output system 146), an external process (e.g., a machine learning process of the output system 146 embodied as a machine learning system), or some other system that a result is available for review.

The interpretation module 128 can be executed by the ACLS system 124 to interpret the search patterns 144 and the search models 145, associated parameters, and any applicable policy(ies) 116. The execution module 130 can take output from the interpretation module 128 and execute the output as needed. The collection module 132 can trigger the collection and subsequent labeling of specific data in conjunction with the execution performed by the execution module 130. The correlation module 134 can correlate alarms, other events, and/or other already-used inputs with data collected by the collection module 132.

The labeling module 136 can be executed by the ACLS system 124 to automatically label recorded data for subsequent consumption by the output system 146. The output system 146 may be a machine learning system (best shown in FIG. 6). The output system 146 may be a user's system, where the user is a data analyst/scientist, for example. Multiple output systems 146 also are contemplated. The labeling module 136 can store the labeled data in the storage database 142 until the summary/notification/publication module 138 is ready to send at least a portion of the labeled data to the output system 146. The summary/notification/publication module 138 can be executed by the ACLS system 124 to summarize the search results, notify the output system 146 that the search results are available, and publish the search results to the output system 146.

Figure 2:
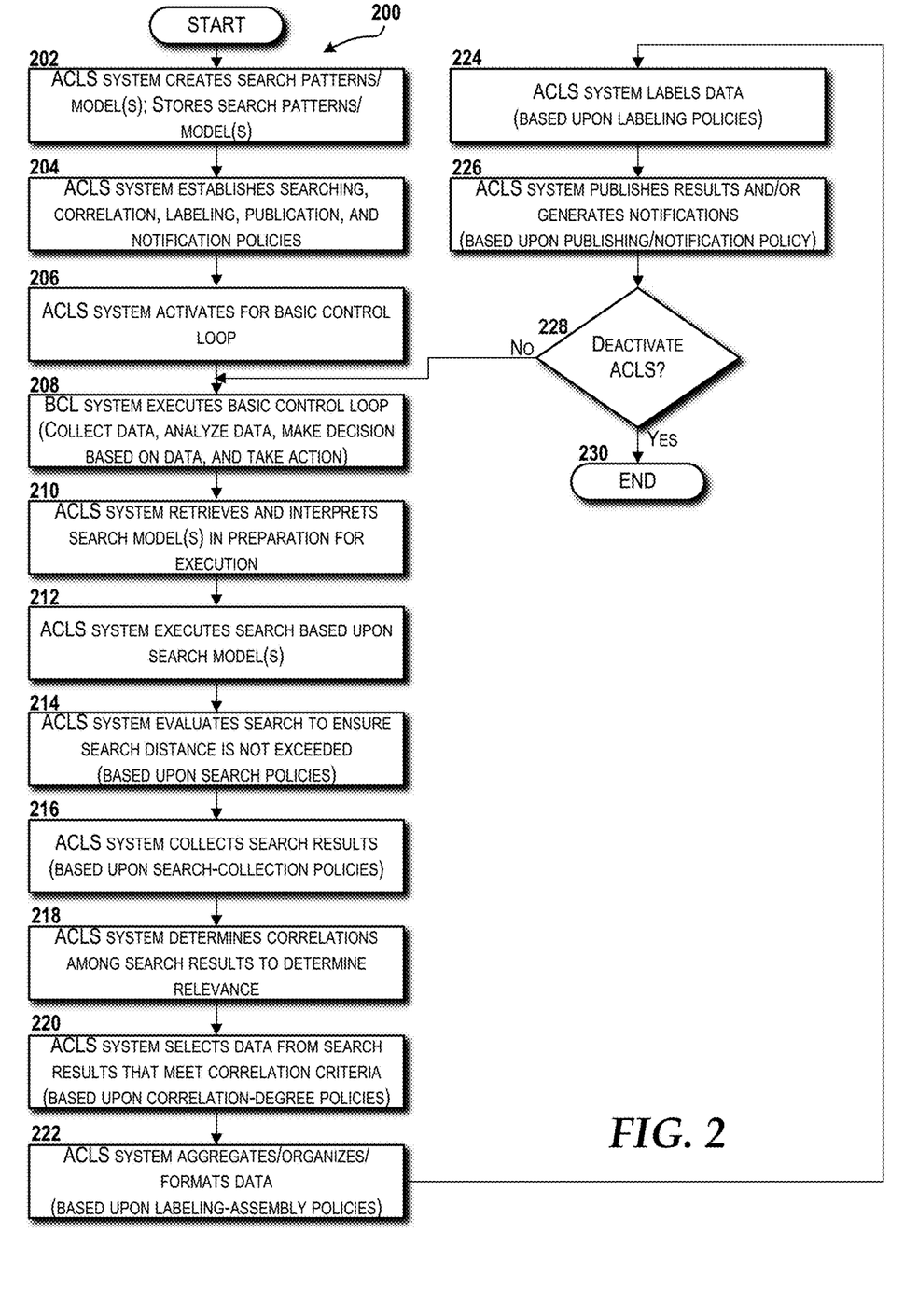
FIG. 2 is a flow diagram illustrating aspects of a method for automatic control loop searching, according to an illustrative embodiment of the concepts and technologies disclosed herein.

Turning now to FIG. 2, a flow diagram illustrating aspects of a method 200 for automatic control loop searching will be described, according to an illustrative embodiment of the concepts and technologies disclosed herein. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the method disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins and proceeds to operation 202. At operation 202, the ACLS system 124 configures ACLS searching functionality. In particular, the ACLS system 124 can execute the design and setup module 126 to provide a user interface through which one or more operators can design and setup the search pattern(s) 144 and/or the search model(s) 145. The ACLS system 124 can create the search pattern(s) 144 and/or the search model(s) 145 based on the input provided via the user interface and can store the search pattern(s) 144 and/or the search model(s) 145 in the search models/patterns/policies database 140. The search model(s) 145 provide high-level information regarding what the ACLS system 124 should search for when a specific search pattern 144 is detected within data that is output from execution of the basic control loop.

From operation 202, the method 200 proceeds to operation 204. At operation 204, the ACLS system 124 establishes the policy(ies) 116, including one or more search policies, one or more collection policies, one or more correlation policies, one or more correlation-degree policies, one or more interpretation policies, one or more labeling policies, one or more publication policies, and/or one or more notification policies. The policy(ies) 116 instruct the various modules regarding what should be done before a search is triggered, during the search, and/or after the search is performed (e.g., sharing results of the search with the output system 146).

From operation 204, the method 200 proceeds to operation 206. At operation 206, the ACLS system 124 activates for a given basic control loop implemented by the BCL system 102 to yield data that is output from execution of the basic control loop. The ACLS system 124 may be activated for multiple basic control loops implemented by the same or a different BCL system 102. For ease of explanation, however, the method 200 will focus on a single basic control loop implemented by a single BCL system 102.

From operation 206, the method 200 proceeds to operation 208. At operation 208, the BCL system 102 executes the basic control loop implemented by the BCL system 102. As described above, the BCL system 102 can collect data from the cloud computing platform 106, analyze the collected data, make one or more decisions based upon the data in accordance with one or more of the policies 116, and perform one or more actions responsive to the decision(s). This is a simplified control loop, but those skilled in the art will appreciate the applicability of the concepts and technologies disclosed herein to other control loops, including control loops having less or more functionality. As such, the simplified control loop described herein should be construed as only one non-limiting example of a control loop.

From operation 208, the method 200 proceeds to operation 210. At operation 210, the ACLS system 124 executes the interpretation module 128 to retrieve and interpret the search pattern(s) 144 and the search model(s) 145 to be used in preparation for execution by the execution module 130. In particular, after execution of the basic control loop (operation 208), the interpretation module 128 can retrieve, from the search models/patterns/policies database 140, one or more search models 145 to be used based upon one or more patterns 144 detected from execution of the basic control loop.

The search pattern(s) 144 can enable the basic control loop to trigger a request to the interpretation module 128 to do something. The interpretation module 128 can interpret the trigger request and map this trigger to one or more search models 145. That is, to map one or more search patterns 144 to one or more search models 145. The basic control loop can have one or more policies 116 to recognize when a search pattern 144 is encountered based on the behavior detected by the execution of the basic control loop. Once detected, the basic control loop can use this trigger point to ask help from the interpretation module 128. The interpretation module 128 can review the search pattern 144 that was detected and other related policy(ies) 116 and decide which search model(s) 145 to map to. Thus, the interpretation module 128 decides what to do with a given trigger. The search model(s) 145 can be predefined as described above, and, over time, the search model(s) 145 can be enhanced, such as via a machine learning derived recommendation.

From operation 210, the method 200 proceeds to operation 212. At operation 212, the ACLS system 124 executes the execution module 130 to conduct a search based upon the search model(s) 145 retrieved at operation 210. From operation 212, the method 200 proceeds to operation 214. At operation 214, the ACLS system 124 can evaluate the search to ensure the specified search distance (e.g., as defined in the policy(ies) 116) is not exceeded. The search distance can define how deep the data collection should be for a given search model 145 and how often/long the data collection process should run. Additional details regarding the search distance are provided above.

From operation 214, the method 200 proceeds to operation 216. At operation 216, the ACLS system 124 collects the search results from the execution module 130 in accordance with the policy(ies) 116 (i.e., based upon one or more search-collection policies). From operation 216, the method 200 proceeds to operation 218. At operation 218, the ACLS system 124 determines whether any correlations exist among the search results, and if so, determines the relevance of the correlation(s). Because the search model 145 defines how many places in the network to collect the new dataset, the collected data will go through data correlation phase to aggregate and analyze to be used to uncover insights by other analytic modules. Note that this dataset is different from the normal data collection dataset running in normal control loop. This is the data to be collected to figure out if the normal control loop is performing suitable actions.

From operation 218, the method 200 proceeds to operation 220. At operation 220, the ACLS system 124, via execution of the correlation module 134, selects data from the search results that meet correlation criteria based upon the policy(ies) 116 (i.e., based upon one or more correlation-degree policies).

From operation 220, the method 200 proceeds to operation 222. At operation 222, the ACLS system 124, via execution of the labeling module 136, aggregates, organizes and formats the data based upon the policy(ies) 116 (i.e., based upon one or more labeling-assembly policies). From operation 222, the method 200 proceeds to operation 224. At operation 224, the ACLS system 124, via execution of the labeling module 136, labels the data based upon the policy(ies) 116 (i.e., based upon one or more labeling policies). The labeling module 136 labels the data ahead of being presented to the output system 146 (e.g., a machine learning system). This removes the need for a manual data labeling process.

From operation 224, the method 200 proceeds to operation 226. At operation 226, the ACLS system 124, via execution of the summary/notification/publication module 138, publishes, to the output system 146, the results of the ACLS system 124 based upon the policy(ies) 116 (i.e., publication policies). The results can be provided to the output system 146 for later use by a human or a machine learning process, for example. However, in some cases, a notification is needed. For example, if after the labeling process, all data rows include a label indicative of failure, one or more notification policies can be executed, by the summary/notification/publication module 138, to instruct the ACLS system 124 to notify an external mitigation processor or network operations group (such as the output system 146 or a portion thereof).

From operation 226, the method 200 proceeds to operation 228. At operation 228, the ACLS system 124 determines whether or not to deactivate the control loop searching process. If the ACLS system 124 determines that the control loop searching process is completed, the method 200 can proceed to operation 230. The method 200 can end at operation 230. If, however, additional rounds of the control loop searching process are needed, the method 200 can return to operation 208, where the BCL system 102 can again execute the basic control loop.

Figure 3:
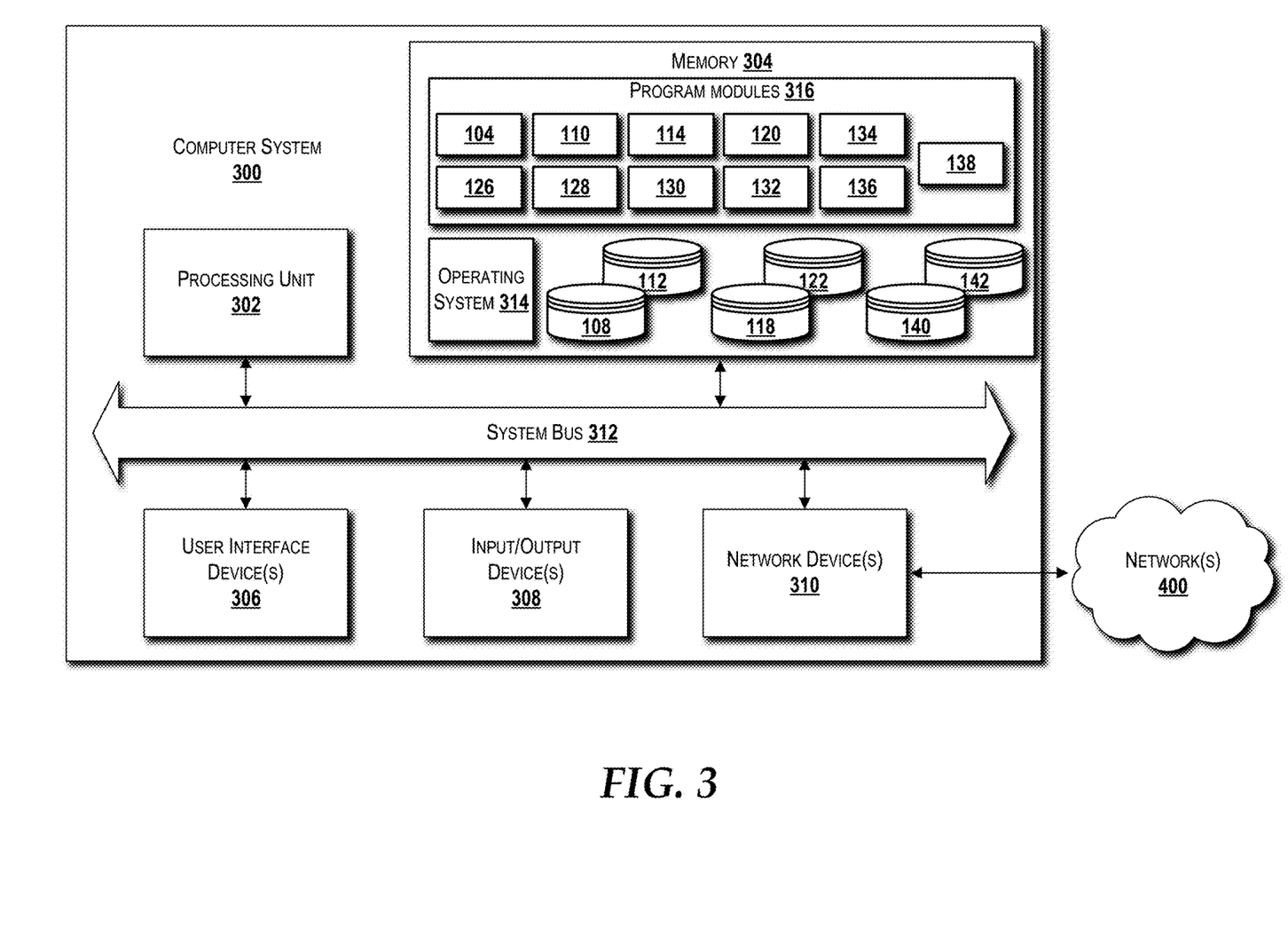
FIG. 3 is a block diagram illustrating an example computer system, according to some illustrative embodiments.

Turning now to FIG. 3, a block diagram illustrating a computer system 300 configured to provide the functionality described herein in accordance with various embodiments of the concepts and technologies disclosed herein will be described. In some embodiments, the BCL system 102, the ACLS system 124, the output system 146, one or more components thereof, and/or other systems disclosed herein can be configured like and/or can have an architecture similar or identical to the computer system 300 described herein with respect to FIG. 3. It should be understood, however, that any of these systems, devices, or elements may or may not include the functionality described herein with reference to FIG. 3.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the computer system 300.

The memory 304 communicates with the processing unit 302 via the system bus 312. In some embodiments, the memory 304 is operatively connected to a memory controller (not shown) that enables communication with the processing unit 302 via the system bus 312. The memory 304 includes an operating system 314 and one or more program modules 316. The operating system 314 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 316 can include various software and/or program modules described herein, such as the data collection module 104, the analysis module 110, the policy/decision module 114, and the action taking module 120 for embodiments in which the BCL system 102 is implemented based, at least in part, upon the architecture of the computer system 300. For embodiments in which the ACLS system 124 is implemented based, at least in part, upon the architecture of the computer system 300, the program modules 316 can include the design and setup module 126, the interpretation module 128, the execution module 130, the collection module 132, the correlation module 134, the labeling module 136, and the summary/notification/publication module 138. In the illustrated example, the memory 304 also can include the raw collected data database 108, the analysis state database 112, the decision state database 118, and the action state database 122 for implementations of the BCL system 102. The memory 304 also can include the search models/patterns/policies database 140 and the storage database 142 for implementations of the ACLS system 124.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium," "computer-readable storage medium," and variations thereof does not include waves or signals per se and/or communication media.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer to output data.

Figure 4:
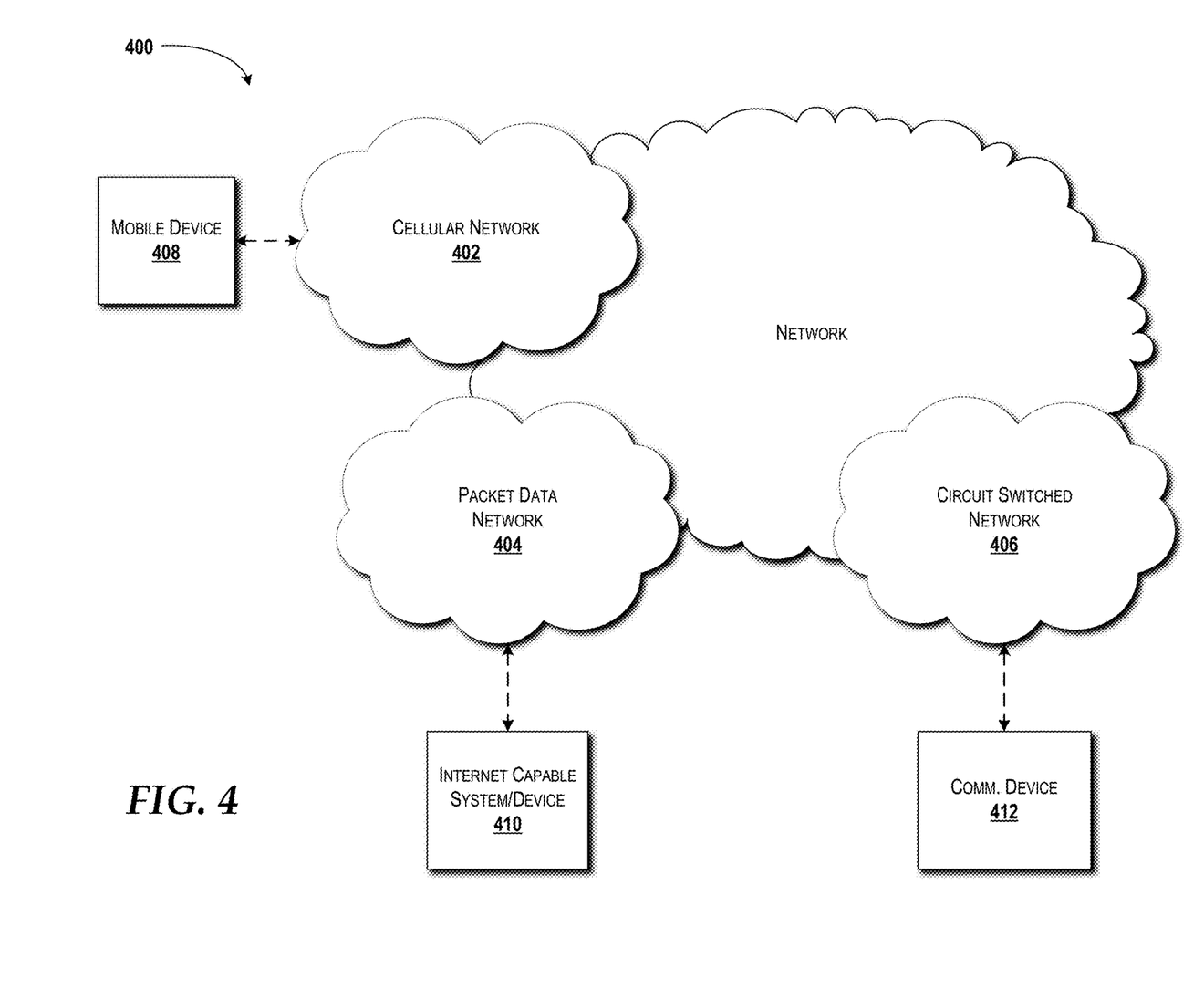
FIG. 4 schematically illustrates a network, according to an illustrative embodiment.

The network devices 310 enable the computer system 300 to communicate with other networks or remote systems via one or more networks, such as the network 400 (best shown in FIG. 4). Examples of the network devices 310 include, but are not limited to, a modem, a RF or infrared ("IR") transceiver, a telephonic interface, a bridge, a router, or a network card. The network(s) may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a Worldwide Interoperability for Microwave Access ("WiMAX") network, or a cellular network. Alternatively, the network(s) may be a wired network such as, but not limited to, a WAN such as the Internet, a LAN, a wired PAN, or a wired MAN.

Turning now to FIG. 4, additional details of an embodiment of a network 400 will be described, according to an illustrative embodiment. In the illustrated embodiment, the network 400 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured to utilize any using any wireless communications technology or combination of wireless communications technologies, some examples of which include, but are not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The mobile communications device 408 can communicate with the cellular network 402 via various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data can be exchanged between the mobile communications device 408 and the cellular network 402 via cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. It should be understood that the cellular network 402 may additionally include backbone infrastructure that operates on wired communications technologies, including, but not limited to, optical fiber, coaxial cable, twisted pair cable, and the like to transfer data between various systems operating on or in communication with the cellular network 402.

The packet data network 404 can include various devices, for example, the BCL system 102, the ACLS system 124, the output system 146, servers, computers, databases, and other devices in communication with one another. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet.

The circuit switched network 406 includes various hardware and software for providing circuit switched communications. The circuit switched network 406 may include, or may be, what is often referred to as a plain old telephone system ("POTS"). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable systems/devices 410, for example, the BCL system 102, the ACLS system 124, the output system 146, a personal computer ("PC"), a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. It should be appreciated that substantially all of the functionality described with reference to the network 400 can be performed by the cellular network 402, the packet data network 404, and/or the circuit switched network 406, alone or in combination with additional and/or alternative networks, network elements, and the like.

Figure 5:
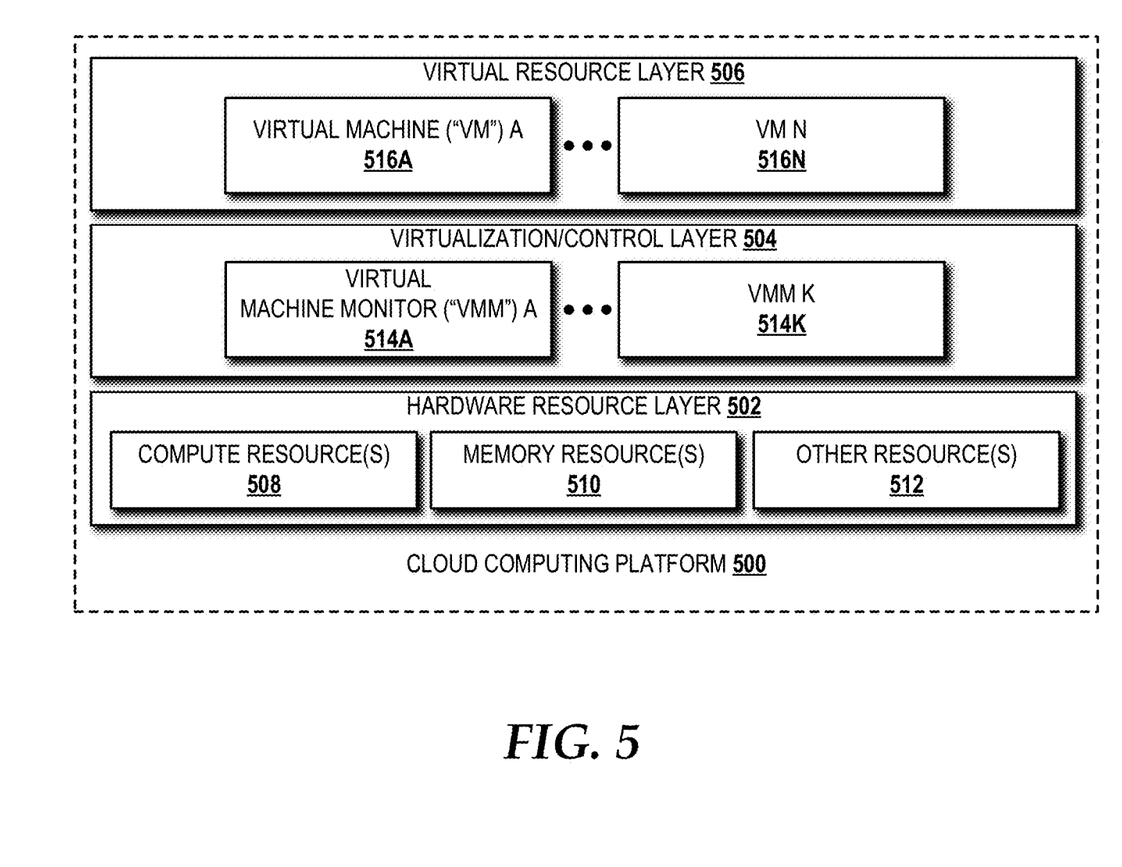
FIG. 5 is a block diagram illustrating a cloud computing platform capable of implementing aspects of the concepts and technologies disclosed herein.

Turning now to FIG. 5, a cloud computing platform architecture 500 capable of implementing aspects of the concepts and technologies disclosed herein will be described, according to an illustrative embodiment. In some embodiments, the cloud computing platform 106 can be implemented, at least in part, on the cloud computing platform architecture 500. The ACLS system 124 and/or the BCL system 102 also can be implemented, at least in part, on the cloud computing platform architecture 500. Those skilled in the art will appreciate that the illustrated cloud computing platform architecture 500 is a simplification of but one possible implementation of an illustrative cloud computing platform, and as such, the cloud computing platform architecture 500 should not be construed as limiting in any way.

The illustrated cloud computing platform architecture 500 includes a hardware resource layer 502, a virtualization/control layer 504, and a virtual resource layer 506 that work together to perform operations as will be described in detail herein. While connections are shown between some of the components illustrated in FIG. 5, it should be understood that some, none, or all of the components illustrated in FIG. 5 can be configured to interact with one other to carry out various functions described herein. In some embodiments, the components are arranged so as to communicate via one or more networks (not shown). Thus, it should be understood that FIG. 5 and the following description are intended to provide a general understanding of a suitable environment in which various aspects of embodiments can be implemented, and should not be construed as being limiting in any way.

The hardware resource layer 502 provides hardware resources, which, in the illustrated embodiment, include one or more compute resources 508, one or more memory resources 510, and one or more other resources 512. The compute resource(s) 506 can include one or more hardware components that perform computations to process data, and/or to execute computer-executable instructions of one or more application programs, operating systems, and/or other software. The compute resources 508 can include one or more central processing units ("CPUs") configured with one or more processing cores. The compute resources 508 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 508 can include one or more discrete GPUs. In some other embodiments, the compute resources 508 can include CPU and GPU components that are configured in accordance with a co-processing CPU/GPU computing model, wherein the sequential part of an application executes on the CPU and the computationally-intensive part is accelerated by the GPU. The compute resources 508 can include one or more system-on-chip ("SoC") components along with one or more other components, including, for example, one or more of the memory resources 510, and/or one or more of the other resources 512. In some embodiments, the compute resources 508 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 508 can be or can include one or more hardware components architected in accordance with an ARM architecture, available for license from ARM HOLDINGS of Cambridge, United Kingdom. Alternatively, the compute resources 508 can be or can include one or more hardware components architected in accordance with an x86 architecture, such an architecture available from INTEL CORPORATION of Mountain View, Calif., and others. Those skilled in the art will appreciate the implementation of the compute resources 508 can utilize various computation architectures, and as such, the compute resources 508 should not be construed as being limited to any particular computation architecture or combination of computation architectures, including those explicitly disclosed herein.

The memory resource(s) 510 can include one or more hardware components that perform storage operations, including temporary or permanent storage operations. In some embodiments, the memory resource(s) 510 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 508.

The other resource(s) 512 can include any other hardware resources that can be utilized by the compute resources(s) 506 and/or the memory resource(s) 510 to perform operations. The other resource(s) 512 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 502 can be virtualized by one or more virtual machine monitors ("VMMs") 514A-514K (also known as "hypervisors;" hereinafter "VMs 514") operating within the virtualization/control layer 504 to manage one or more virtual resources that reside in the virtual resource layer 506. The VMMs 514 can be or can include software, firmware, and/or hardware that alone or in combination with other software, firmware, and/or hardware, manages one or more virtual resources operating within the virtual resource layer 506.

The virtual resources operating within the virtual resource layer 506 can include abstractions of at least a portion of the compute resources 508, the memory resources 510, the other resources 512, or any combination thereof. These abstractions are referred to herein as virtual machines ("VMs"). In the illustrated embodiment, the virtual resource layer 506 includes VMs 516A-516N (hereinafter "VMs 516").

Figure 6:
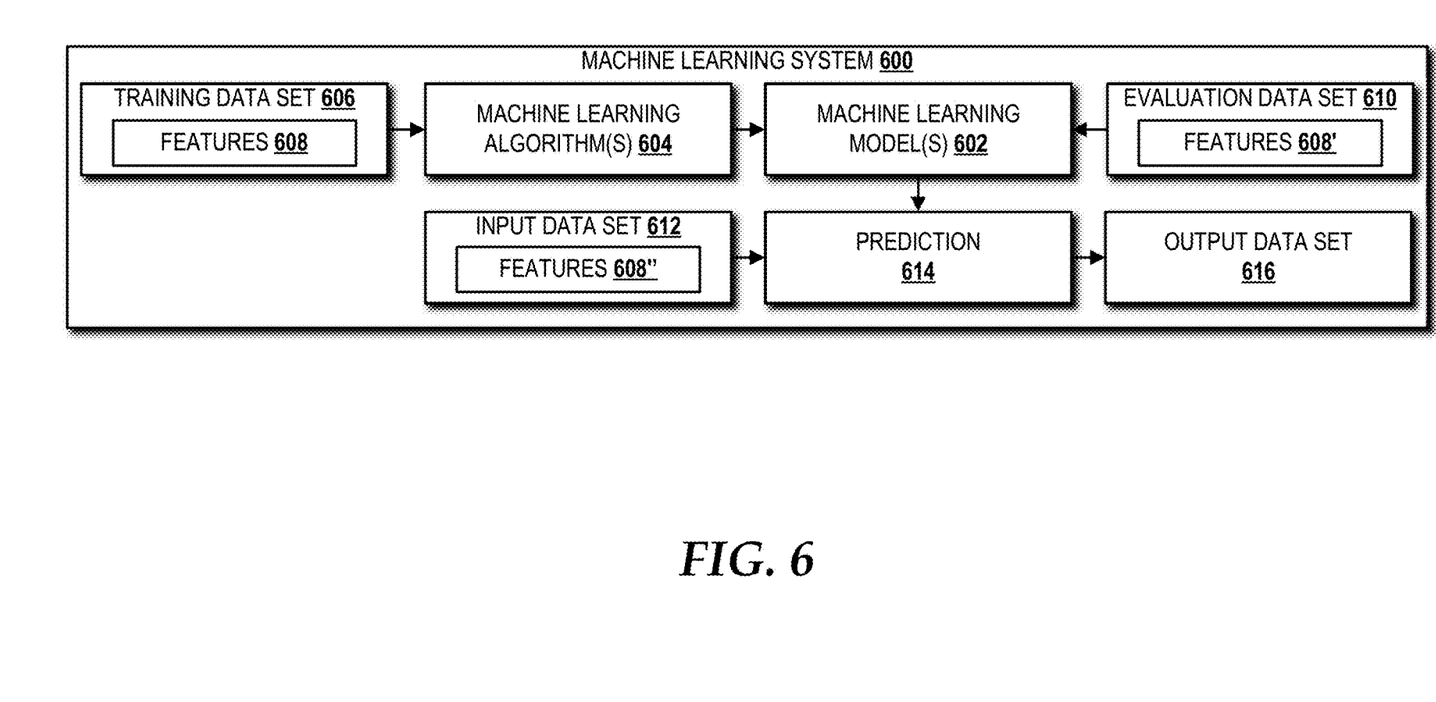
FIG. 6 is a block diagram illustrating a machine learning system capable of implementing aspects of the concepts and technologies disclosed herein.

Turning now to FIG. 6, a machine learning system 600 capable of implementing aspects of the embodiments disclosed herein will be described. In some embodiments, the output system 146 can be a machine learning system such as the machine learning system 600. The illustrated machine learning system 600 includes one or more machine learning models 602. The machine learning models 602 can include supervised and/or semi-supervised learning models. The machine learning model(s) 602 can be created by the machine learning system 600 based upon one or more machine learning algorithms 604. The machine learning algorithm(s) 604 can be any existing, well-known algorithm, any proprietary algorithms, or any future machine learning algorithm. Some example machine learning algorithms 604 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 604 based upon the problem(s) to be solved by machine learning via the machine learning system 600.

The machine learning system 600 can control the creation of the machine learning models 602 via one or more training parameters. In some embodiments, the training parameters are selected modelers at the direction of an enterprise, for example. Alternatively, in some embodiments, the training parameters are automatically selected based upon data provided in one or more training data sets 606. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 604 converges to the optimal weights. The machine learning algorithm 604 can update the weights for every data example included in the training data set 606. The size of an update is controlled by the learning rate. A learning rate that is too high might prevent the machine learning algorithm 604 from converging to the optimal weights. A learning rate that is too low might result in the machine learning algorithm 604 requiring multiple training passes to converge to the optimal weights.

The model size is regulated by the number of input features ("features") 606 in the training data set 606. A greater the number of features 608 yields a greater number of possible patterns that can be determined from the training data set 606. The model size should be selected to balance the resources (e.g., compute, memory, storage, etc.) needed for training and the predictive power of the resultant machine learning model 602.

The number of training passes indicates the number of training passes that the machine learning algorithm 604 makes over the training data set 606 during the training process. The number of training passes can be adjusted based, for example, on the size of the training data set 606, with larger training data sets being exposed to fewer training passes in consideration of time and/or resource utilization. The effectiveness of the resultant machine learning model 602 can be increased by multiple training passes.

Data shuffling is a training parameter designed to prevent the machine learning algorithm 604 from reaching false optimal weights due to the order in which data contained in the training data set 606 is processed. For example, data provided in rows and columns might be analyzed first row, second row, third row, etc., and thus an optimal weight might be obtained well before a full range of data has been considered. By data shuffling, the data contained in the training data set 606 can be analyzed more thoroughly and mitigate bias in the resultant machine learning model 602.

Regularization is a training parameter that helps to prevent the machine learning model 602 from memorizing training data from the training data set 606. In other words, the machine learning model 602 fits the training data set 606, but the predictive performance of the machine learning model 602 is not acceptable. Regularization helps the machine learning system 600 avoid this overfitting/memorization problem by adjusting extreme weight values of the features 608. For example, a feature that has a small weight value relative to the weight values of the other features in the training data set 606 can be adjusted to zero.

The machine learning system 600 can determine model accuracy after training by using one or more evaluation data sets 610 containing the same features 608' as the features 608 in the training data set 606. This also prevents the machine learning model 602 from simply memorizing the data contained in the training data set 606. The number of evaluation passes made by the machine learning system 600 can be regulated by a target model accuracy that, when reached, ends the evaluation process and the machine learning model 602 is considered ready for deployment.

After deployment, the machine learning model 602 can perform a prediction operation ("prediction") 614 with an input data set 612 having the same features 608" as the features 608 in the training data set 606 and the features 608' of the evaluation data set 610. The results of the prediction 614 are included in an output data set 616 consisting of predicted data. The machine learning model 602 can perform other operations, such as regression, classification, and others. As such, the example illustrated in FIG. 6 should not be construed as being limiting in any way.

Based on the foregoing, it should be appreciated that aspects of automated control loop searching have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:

creating, by an automated control loop searching ("ACLS") system comprising a processor executing instructions, a search model, wherein the search model provides high-level information regarding what the ACLS system should search for when a search pattern is detected within data that is collected during execution of a control loop by a control loop system;

activating, by the ACLS system, the ACLS system for the control loop executed by the control loop system;

detecting, by the ACLS system, the search pattern within the data;

selecting, by the ACLS system, the search model based on the search pattern detected within the data;

conducting, by the ACLS system, based upon the search model, a search for additional data that is different from the data that is collected during execution of the control loop by the control loop system, wherein the search model defines a search distance that a data source of the additional data is required to be away from a data source used by the control loop system to collect the data;

collecting, by the ACLS system, search results of the search, wherein the search results comprise the additional data; and selecting, by the ACLS system, at least a portion of the additional data from the search results that correlates with the data collected during execution of the control loop by the control loop system.

2. The method of claim 1, further comprising establishing, by the ACLS system, a policy.

3. The method of claim 2, wherein the policy comprises a searching policy that specifies the search distance.

4. The method of claim 1, further comprising evaluating the search to ensure the search distance is not exceeded.

5. The method of claim 1, further comprising:

storing, by the ACLS system, the search model in a database;

retrieving, by the ACLS system, the search model from the database; and interpreting, by the ACLS system, the search model to determine the additional data to search for.

6. The method of claim 1, further comprising determining whether a correlation exists among the search results and the data collected during execution of the control loop by the control loop system, wherein the correlation is defined, at least in part, by correlation criteria.

7. The method of claim 1, further comprising:

formatting, by the ACLS system, at least the portion of the additional data;

labeling, by the ACLS system, at least the portion of the additional data for use by an output system; and providing, by the ACLS system, at least the portion of the additional data to the output system.

8. The method of claim 7, wherein the output system comprises a machine learning system or a system operated by a user.

9. A computer-readable storage medium comprising computer-executable instructions that, when executed by a processor of an automated control loop searching ("ACLS") system, cause the processor to perform operations comprising:

creating a search model that provides high-level information regarding what the ACLS system should search for when a search pattern is detected within data that is collected during execution of a control loop by a control loop system;

activating the ACLS system for the control loop executed by the control loop system;

detecting the search pattern within the data;

selecting the search model based on the search pattern detected within the data;

conducting, based upon the search model, a search for additional data that is different from the data that is collected during execution of the control loop by the control loop system, wherein the search model defines a search distance that a data source of the additional data is required to be away from a data source used by the control loop system to collect the data;

collecting search results of the search, wherein the search results comprise the additional data; and selecting at least a portion of the additional data from the search results that correlates with the data collected during execution of the control loop by the control loop system.

10. The computer-readable storage medium of claim 9, wherein the operations further comprise establishing a policy.

11. The computer-readable storage medium of claim 10, wherein the policy comprises a searching policy that specifies the search distance.

12. The computer-readable storage medium of claim 9, further comprising evaluating the search to ensure the search distance is not exceeded.

13. The computer-readable storage medium of claim 9, wherein the operations further comprise:

storing the search model in a database;

retrieving the search model from the database; and interpreting the search model to determine the additional data to search for.

14. The computer-readable storage medium of claim 9, wherein the operations further comprise determining whether a correlation exists among the search results and the data collected during execution of the control loop by the control loop system, wherein the correlation is defined, at least in part, by correlation criteria.

15. The computer-readable storage medium of claim 9, wherein the operations further comprise:

formatting at least the portion of the additional data;

labeling at least the portion of the additional data for use by an output system; and providing at least the portion of the additional data to the output system, wherein the output system comprises a machine learning system or a system operated by a user.

16. An automated control loop searching ("ACLS") system comprising:

a processor; and a memory comprising computer-executable instructions that, when executed by the processor, cause the processor to perform operations comprising creating a search model that provides high-level information regarding what the ACLS system should search for when a search pattern is detected within data that is collected during execution of a control loop by a control loop system, activating the ACLS system for the control loop executed by the control loop system, detecting the search pattern within the data, selecting the search model based on the search pattern detected within the data, conducting, based upon the search model, a search for additional data that is different from the data that is collected during execution of the control loop by the control loop system, wherein the search model defines a search distance that a data source of the additional data is required to be away from a data source used by the control loop system to collect the data, collecting search results of the search, wherein the search results comprise the additional data, and selecting at least a portion of the additional data from the search results that correlates with the data collected during execution of the control loop by the control loop system.

17. The ACLS system of claim 16, wherein the operations further comprise establishing a searching policy that specifies the search distance.

18. The ACLS system of claim 16, wherein the operations further comprise evaluating the search to ensure the search distance is not exceeded.

19. The ACLS system of claim 16, wherein the operations further comprise:

storing the search model in a database;

retrieving the search model from the database; and interpreting the search model to determine the additional data to search for.

20. The ACLS system of claim 16, wherein the operations further comprise determining whether a correlation exists among the search results and the data collected during execution of the control loop by the control loop system, wherein the correlation is defined, at least in part, by correlation criteria.

* * * * *